(12) United States Patent
You et al.

(10) Patent No.: US 9,735,872 B2
(45) Date of Patent: Aug. 15, 2017

(54) REMOTE DEVICE OF OPTICAL RELAY SYSTEM

(71) Applicant: SOLiD, INC., Gyeonggi-do (KR)

(72) Inventors: Young Ju You, Incheon (KR); Kyung Eun Han, Gyeonggi-do (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 14/411,475

(22) PCT Filed: Dec. 19, 2013

(86) PCT No.: PCT/KR2013/011898
§ 371 (c)(1),
(2) Date: Dec. 26, 2014

(87) PCT Pub. No.: WO2015/083872
PCT Pub. Date: Jun. 11, 2015

(65) Prior Publication Data
US 2016/0285552 A1 Sep. 29, 2016

(30) Foreign Application Priority Data

Dec. 6, 2013 (KR) .................. 10-2013-0151166

(51) Int. Cl.
*H04B 10/00* (2013.01)
*H04J 14/02* (2006.01)
(Continued)

(52) U.S. Cl.
CPC . *H04B 10/25752* (2013.01); *H04B 10/25753* (2013.01); *H04B 10/29* (2013.01);
(Continued)

(58) Field of Classification Search
CPC H04B 10/25752; H04W 4/00; H04W 88/085; H04W 80/02; H04L 12/40;
(Continued)

(56) References Cited

U.S. PATENT DOCUMENTS 2,929,864 A * 3/1960 Light ................. H04L 12/40
178/2 R
4,562,428 A * 12/1985 Harman ............ G08B 13/2491
340/505

(Continued)

FOREIGN PATENT DOCUMENTS

KR  10-2008-0097795 A  11/2008
KR  10-2008-0107795 A  12/2008

OTHER PUBLICATIONS

International Search Report for PCT/KR2013/011898.

*Primary Examiner* — Ken N Vanderpuye
*Assistant Examiner* — Abbas H Alagheband
(74) *Attorney, Agent, or Firm* — Sughrue Mion, PLLC (57) ABSTRACT

A remote device of an optical relay system includes first and second remote driving units each extracting transmission signals of different frequency bands from downlink Radio Frequency (RF) signals provided from an optical conversion unit and outputting the transmission signals; and a downlink path control unit receiving the downlink RF signals from the optical conversion unit and transmitting the downlink RF signals to the second remote driving unit through the first remote driving unit, or transmitting the downlink RF signals to the second remote driving unit by bypassing the first remote driving unit.

7 Claims, 6 Drawing Sheets (51) Int. Cl.
- *H04W 4/00* (2009.01)
- *H04B 7/15* (2006.01)
- *H04N 13/02* (2006.01)
- *H04N 7/18* (2006.01)
- *H04B 10/2575* (2013.01)
- *H04B 10/29* (2013.01)
- *H04W 88/08* (2009.01)
- *H04J 3/00* (2006.01)

(52) U.S. Cl.
CPC .............. *H04J 3/00* (2013.01); *H04J 14/02* (2013.01); *H04W 88/085* (2013.01)

(58) Field of Classification Search
CPC .... H04N 13/02; H04N 5/2252; H04N 5/2257; H04N 5/23219; H04N 5/23251; H04N 5/225; H04N 5/232; H04N 5/222; H04N 5/2254; H04N 2213/001
USPC .... 398/115, 96, 79; 340/552, 505, 517, 531, 340/553; 348/47, 157; 370/328, 329, 370/320, 338; 455/11.1
See application file for complete search history.

(56) References Cited

U.S. PATENT DOCUMENTS

| | | | | |
|---|---|---|---|---|
| 5,880,863 | A * | 3/1999 | Rideout | H04B 10/2755 398/59 |
| 6,005,884 | A * | 12/1999 | Cook | H04W 88/085 370/338 |
| 6,801,767 | B1 * | 10/2004 | Schwartz | H04B 10/25755 398/115 |
| 7,047,028 | B2 * | 5/2006 | Cagenius | H04B 10/25758 398/115 |
| 7,650,112 | B2 * | 1/2010 | Utsumi | H04B 10/25754 370/338 |
| 8,396,368 | B2 * | 3/2013 | Tarlazzi | H04B 7/0413 398/115 |
| 8,400,292 | B2 * | 3/2013 | Kummetz | G01S 5/0289 340/517 |
| 8,855,489 | B2 * | 10/2014 | Boldi | H04J 14/0226 398/58 |
| 9,627,807 | B2 * | 4/2017 | Gao | H01R 13/6273 |
| 2002/0003645 | A1 * | 1/2002 | Kim | H04B 10/25755 398/115 |
| 2004/0037565 | A1 * | 2/2004 | Young | H04B 10/25752 398/115 |
| 2004/0096222 | A1 * | 5/2004 | Cagenius | H04B 10/25758 398/115 |
| 2004/0137839 | A1 * | 7/2004 | Lim | H04B 10/25755 455/7 |
| 2006/0222369 | A1 * | 10/2006 | Kim | H04B 10/25755 398/115 |
| 2006/0239685 | A1 * | 10/2006 | Woo | H04B 10/25753 398/115 |
| 2007/0117592 | A1 * | 5/2007 | Bauman | H04B 7/0842 455/562.1 |
| 2007/0133995 | A1 * | 6/2007 | Lee | H04B 10/25758 398/115 |
| 2008/0145056 | A1 * | 6/2008 | Boldi | H04J 14/0226 398/96 |
| 2008/0145061 | A1 * | 6/2008 | Lee | H04B 10/25758 398/139 |
| 2009/0316608 | A1 * | 12/2009 | Singh | H04B 7/15507 370/280 |
| 2009/0316609 | A1 * | 12/2009 | Singh | H04B 7/2609 370/280 |
| 2009/0318089 | A1 * | 12/2009 | Stratford | H04W 88/085 455/67.11 |
| 2010/0128676 | A1 | 5/2010 | Wu et al. | |
| 2010/0208777 | A1 * | 8/2010 | Ogaz | H04L 12/2838 375/219 |
| 2010/0278530 | A1 * | 11/2010 | Kummetz | H04W 88/085 398/41 |
| 2010/0310256 | A1 * | 12/2010 | Shpantzer | H04B 10/61 398/74 |
| 2011/0210843 | A1 * | 9/2011 | Kummetz | G01S 5/0289 340/517 |
| 2011/0236024 | A1 * | 9/2011 | Mao | H04B 10/25752 398/115 |
| 2011/0237178 | A1 * | 9/2011 | Seki | H04W 36/18 455/3.01 |
| 2012/0039254 | A1 * | 2/2012 | Stapleton | H03F 1/3247 370/328 |
| 2012/0087672 | A1 * | 4/2012 | Han | H04B 10/25754 398/115 |
| 2012/0269509 | A1 * | 10/2012 | Hultermans | H04B 10/25756 398/43 |
| 2013/0089336 | A1 * | 4/2013 | Dahlfort | H04J 14/0282 398/115 |
| 2014/0016583 | A1 * | 1/2014 | Smith | H04J 14/0227 370/329 |
| 2014/0024402 | A1 * | 1/2014 | Singh | H04B 17/23 455/501 |
| 2014/0050484 | A1 * | 2/2014 | Sun | H04B 10/2575 398/116 |
| 2014/0169263 | A1 * | 6/2014 | Stapleton | H04B 7/026 370/315 |
| 2014/0308043 | A1 * | 10/2014 | Heidler | H04B 10/11 398/115 |
| 2015/0086204 | A1 * | 3/2015 | Kaneda | H04J 14/0298 398/65 |
| 2016/0080082 | A1 * | 3/2016 | Lemson | H03F 1/3247 398/115 |

* cited by examiner

REMOTE DEVICE OF OPTICAL RELAY SYSTEM

TECHNICAL FIELD

The inventive concept relates to a remote device of an optical relay system, and more particularly, to a remote device of an optical relay system which enables a serial transmission of RF signals between internal units.

BACKGROUND ART

In general, a relay system may be used to expand a service coverage even to a shadow area which a signal from a base station is unlikely to reach during a mobile communications service due to a special topography of an area or a natural feature. An optical relay system may be referred to as an example of the relay system. The optical relay system is widely used for the reason that it serves to minimize a signal loss in a recent mobile communication service during which a relatively high-frequency signal is utilized.

The optical relay system includes a donor device and a remote device that are connected to each other via an optic medium. The donor device serves to convert an RF signal received from the base station to an optical signal thereby transmitting it to the remote device, and the remote device serves to restore the optical signal received from the donor device to the RF signal thereby emitting to a terminal. Contrary thereto, the remote device converts the RF signal received from the terminal to the optical signal thereby transmitting to the donor, and the donor device restores the optical signal received from the remote device to the RF signal thereby transmitting to the base station.

In general, the remote device of the optical relay system includes remote driving units corresponding to each of frequency bands so that it can amplify and adjust the RF signal photoelectric-converted by an optical conversion unit to transmit to the terminal or to receive from the terminal the RF signal for each frequency band. And, the remote driving units are connected in parallel to the optical conversion unit within the remote device of the optical relay system. That is, the remote driving units each receive the RF signal divided for each corresponding frequency band through a divider provided in the optical conversion unit, or the optical conversion unit and a separate divider.

As such, in the remote device of the optical relay system, when the remote driving units are arranged in parallel, there is a high possibility that original signals are damaged as the RF signals in the range of various frequency bands are processed by being divided and combined by one divider. Further, there are problems that it is difficult to design electric wiring between the optical conversion unit and the remote driving unit, there is a high probability of an erroneous connection there-between, and it is difficult to arrange, assemble and replace the remote driving units.

An object of the inventive concept is to provide a remote device of an optical relay system enabling remote driving units to be arranged in series therein, and arrangement, assembly and replacement of the remote driving units to be easier.

SUMMARY

The inventive concept provides a remote device includes first and second remote driving units each extracting transmission signals of different frequency bands from downlink Radio Frequency (RF) signals provided from an optical conversion unit and outputting the transmission signals, and a downlink path control unit for receiving the downlink RF signals from the optical conversion unit and transmitting the downlink RF signals to the second remote driving unit through the first remote driving unit, or transmitting the downlink RF signals to the second remote driving unit by bypassing the first remote driving unit.

According to an embodiment of the inventive concept, the downlink path control unit may include a bypass line for bypassing the first remote driving unit, a first switch for controlling a connection between the optical conversion unit and the first remote driving unit or a connection between the optical conversion unit and the bypass line, and a second switch for controlling a connection between the first remote driving unit and the second remote driving unit or a connection between the bypass line and the second remote driving unit.

According to another embodiment of the inventive concept, the first remote driving unit may include a coupling and filtering unit for transmitting the downlink RF signal to the second remote driving unit and extracting a transmission signal of a first frequency band from the downlink RF signal, and a downlink amplification unit for amplifying and outputting the extracted transmission signal of the first frequency band.

According to still another embodiment of the inventive concept, the optical conversion unit may convert an optical signal to the downlink RF signal and output the downlink RF signal.

According to yet another embodiment of the inventive concept, the first remote driving unit receives a reception signal of the first frequency band, the second remote driving unit receives a reception signal of the second frequency band, and the remote device may include an uplink path control unit for receiving the reception signal of the second frequency band from the second remote driving unit and transmitting the reception signal of the first frequency band and the reception signal of the second frequency band to the optical conversion unit through the first remote driving unit, or bypassing the first remote driving unit to thereby transmit the reception signal of the second frequency band to the optical conversion unit.

According to still yet another embodiment of the inventive concept, the uplink pathway control unit may include a bypass line for bypassing the first remote driving unit, a first switch for controlling a connection between the optical conversion unit and the first remote driving unit or a connection between the optical conversion unit and the bypass line, and a second switch for controlling a connection between the first remote driving unit and the second remote driving unit or a connection between the bypass line and the second remote driving unit.

According to further embodiment of the inventive concept, the first remote driving unit includes a coupling and filtering unit for transmitting the downlink RF signal to the second remote driving unit and extracting a transmission signal of the first frequency band from the RF signal, a downlink amplification unit for amplifying and outputting the extracted transmission signal of the first frequency band and an uplink amplification unit for amplifying and outputting the reception signal of the first frequency band, wherein the coupling and filtering unit receives the reception signal of the first frequency band amplified from the uplink amplification unit, receives the reception signal of the second frequency band from the second remote driving unit, and couple and output the amplified reception signal of the first frequency band and the reception signal of the second frequency band.

The remote device according to the inventive concept enables the remote driving units to be connected in series to each other through the corresponding path control unit, thereby allowing the remote driving units each to receive the RF signals of all frequency bands and to extract the signals of different frequency bands there-from thereby transmitting to the terminal. Accordingly, since the remote device does not require dividing and coupling of RF signals by one divider, it is possible to prevent original signals from being damaged and it is easy to design wiring between the optical conversion unit and the remote driving unit in the remote device, thereby improving its reliability as the possibility of an erroneous connection there-between decreases. Further, the remote device enables the arrangement and assembly of the remote driving units therein to be easier.

Further, the remote device allows the RF signal to bypass the corresponding remote driving unit when any one of the remote driving units is removed through the corresponding path control unit, thereby making it possible to maintain the normal operation state. Accordingly, it is possible to easily change and replace the remote driving unit when a user frequency band is changed or at the time of its erroneous operation.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Hereinafter, exemplary embodiments of the inventive concept will be described below in more detail with reference to the accompanying drawings. Throughout the disclosure, like reference numerals refer to like parts throughout the various figures and embodiments of the inventive concept.

The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Detailed descriptions of known functions and configurations which have been deemed to make the gist of the present invention unnecessarily obscure will be omitted below. Further, it will be appreciated by those skilled in the art that the terminologies used in the descriptions are just intended to appropriately illustrate the embodiments of the inventive concept, but may be changed by the particular intended application, use environment, or practice in the art. Accordingly, the definitions for the terminologies should be determined based on the contents throughout the specification. In the figures, reference numbers refer to the same or equivalent parts of the present invention throughout the several figures of the drawing.

The optical relay system according to the embodiment of the inventive concept is a system for expanding the service coverage, without an extension of base stations, in the shadow area such as the inside of a building, a tunnel, a subway, the heart of mountains or the like from which a wireless signal cannot easily be connected to the base stations, which may be, e.g., a distributed antenna system (DAS).

The optical relay system according to the embodiment of the inventive concept may support a mobile communication standard used in the whole world. For example, the optical relay system may be support the frequency bands of very high frequency (VHF), ultra high frequency (UHF), 700 MHz, 800 MHz, 850 MHz, 900 MHz, 1,900 Hz, and 2,100 MHz. Further, the optical relay system may support a number of mobile communication standards such as an Advanced Mobile Phone Service (AMPS) of a typical mobile communication service, a Time-Division Multiplexing Access (TDMA) of a digital type, a Code Division Multiple Access (CDMA), an asynchronous CDMA (Wideband Code Division Multiple Access: WCDMA), a High Speed Downlink Packet Access (HSDPA), a Long Term Evolution (LTE), a Long Term Evolution Advanced (LTE-A), and the like.

The optical relay system according to the embodiment of the inventive concept is formed with units modulated for each frequency. In order to service a required frequency, a unit of the units corresponding to a selected frequency has only to be inserted into each device in order to service a required frequency. That is, the optical relay system according to the embodiment of the inventive concept is formed in one body type, in which there is no need to provide a new installation whenever a new frequency is serviced.

Figure 1:
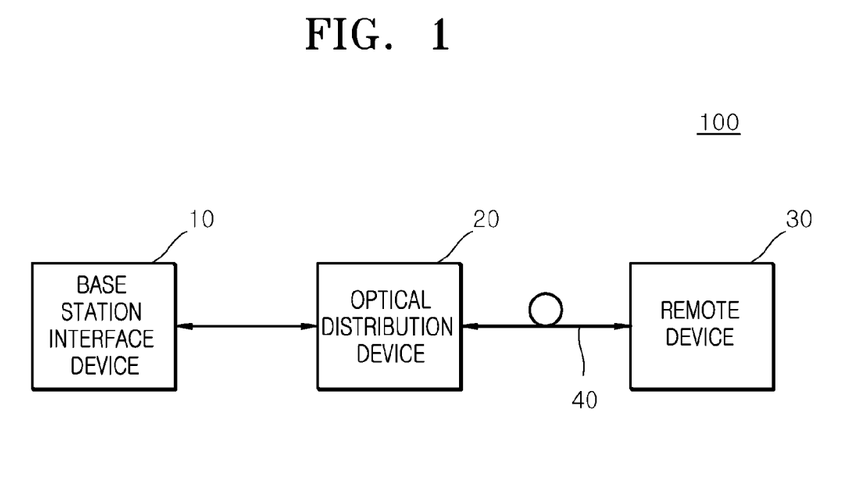
FIG. 1 is a schematic block diagram showing an optical relay system according to an embodiment of the inventive concept.

FIG. 1 is a schematic block diagram showing the optical relay system 100 according to an embodiment of the inventive concept. Although FIG. 1 shows the optical relay system 100 includes one optical distribution device 20 and one remote device 30, but the optical relay system 100 is not limited to this embodiment. The optical relay system 100 each may include at least two or more optical distribution devices 20 and remote devices 30. Hereinafter, for descriptive convenience, the optical relay system 100 includes one optical distribution device 20 and one remote device 30 will be illustrated as an example. Further, in FIG. 1, the base station interface device 10 and the optical distribution device 20 are separately composed in the optical relay system 100. However, the base station interface device 10 and the optical distribution device 20 may be integrated into one unit.

Referring to FIG. 1, the optical relay system 100 may include the base station interface device 10, the optical distribution device 20 and the remote device 30.

The base station interface device 10 may be connected to the optical distribution device 20, for example, by wire or radio.

The base station interface device 10 may receive the downlink RF signals from at least one base station (not shown), and transmit the received downlink RF signal to the optical distribution device 20. The downlink RF signal may include signals of a plurality of frequency bands, and the base station interface device 10 may combine the signals of the plurality of frequency bands thereby transmitting to the optical distribution device (20).

The base station interface device 10 may receive the uplink RF signal, which is provided from the terminals, through the optical distribution device 20. The uplink RF signal may be a signal in which signals of a plurality of frequency bands are combined, and the base station interface device 10 may divide the uplink RF signals according to each frequency band to transmit to the base station.

The optical distribution device 20 may be connected to the remote device 30 via the optic medium 40. The optic medium 40 may be, for example, a optic cable.

The optical distribution device 20 may convert the downlink RF signal received from the base station interface device 10 into an optical signal, and transmit the optical signal to the remote device 30 through the optic medium 40. The optical distribution device 20 may include a converting means for an electricity to light conversion, for example, a laser diode (not shown). In the case where the optical distribution device 20 is connected to a plurality of remote devices, the optical distribution device 20 may include an optic splitter (not shown) for dividing the optical signal to transmit it to each of the remote devices. The optical distribution device 20 may include an optical compensation attenuator (not shown) for compensating a loss due to the optic medium 40.

The optical distribution device 20 may convert an optical signal received from the remote device 30 to the uplink RF signal, and transmit the uplink RF signal to the base station interface device 10. The optical distribution device 20, in the case of being connected to the plurality of remote devices, may include an optical coupler (not shown) for combining the optical signals received from each remote unit.

The remote device 30 may convert an optical signal received from the optical distribution device 20 to the downlink RF signal, and transmit the converted downlink RF signal through the antenna (not shown).

The remote device 30 may convert the uplink RF signal provided from the terminals into an optical signal, and transmit the optical signal to the optical distribution device 20 through the optical medium 40.

Hereinafter, the remote device 30 will be described in more detail with reference to FIGS. 2 to 7.

Figure 2:
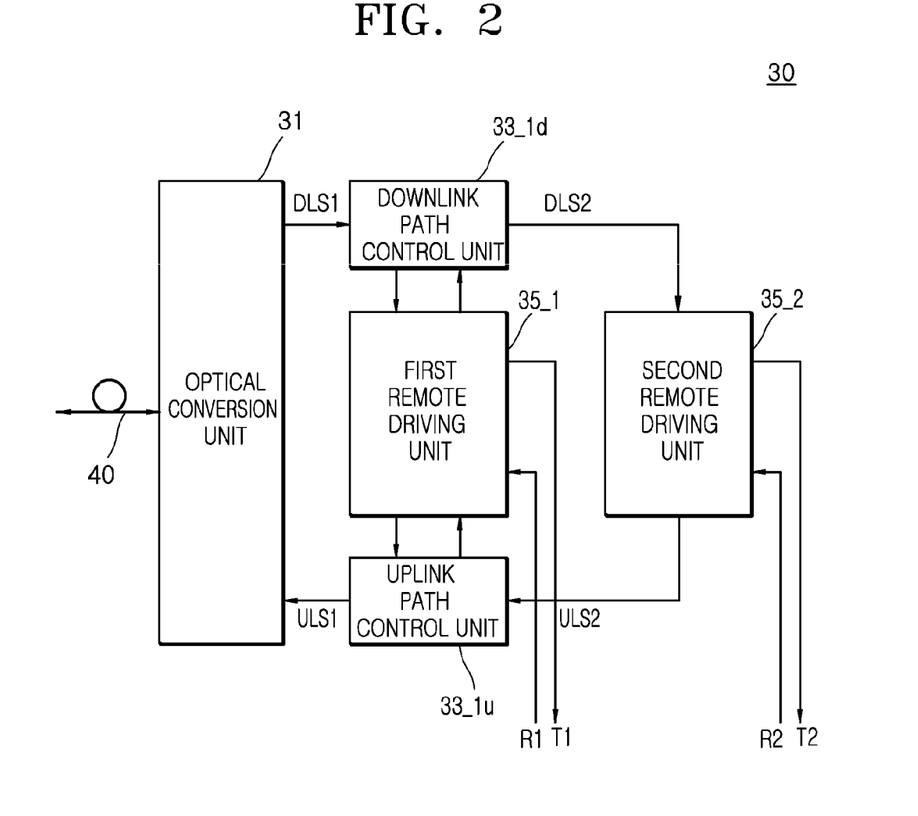
FIG. 2 is a schematic block diagram showing a remote device according to an embodiment of the inventive concept.

FIG. 2 is a schematic block diagram showing the remote device 30 according to one embodiment of the inventive concept. Although not shown in FIG. 2, the remote device 30 may further include a processor unit that controls each unit composed in the remote device 30 and monitors the status of the base station interface device 10 and the optical distribution device 20 via a modem or the like, a duplexer that combines the output signals (e.g., transmission signals T1, T2 of the first and second frequency bands) of the first and second remote driving units 35_1, 35_2, or that distributes the signals (e.g., reception signals R1, R2 of the first and second frequency bands) received from the terminals to provide the signals to the corresponding first and second remote driving units 35_1, 35_2, and an antenna connected to the duplexer. Hereinafter, for descriptive convenience, a detailed description thereof will be omitted. And, although FIG. 2 shows that the remote device 30 includes only two remote driving units 35_1, 35_2, but the inventive concept is not limited thereto. The case where the remote device 30 includes a larger number of remote driving units will be described with reference to FIGS. 5 to 7 in the following.

Referring to FIG. 2, the remote device 30 may include an optical conversion unit 31, a downlink path control unit 33_1*d*, an uplink path control unit 33_1*u*, and first and second remote driving units 35_1, 35_2.

The optical conversion unit 31 may convert an optical signal provided from the optical distribution device 20 via the optical medium 40 into the downlink RF signal DLS1. The optical conversion unit 31 may output the downlink RF signal DLS1 to the downlink path control unit 33_1*d*. The downlink RF signal DLS1 may include transmission signals of the first and second frequency bands T1, T2. The transmission signals T1, T2 of the first and second frequency bands may be signals that are different in its frequency band from each other.

The optical conversion unit 31 may receive an uplink RF signal ULS1 from the uplink path control unit 33_1*u*. The optical conversion unit 31 may convert the uplink RF signal ULS1 to an optical signal, and transmit the optical signal converted through the optical medium 40 to the optical distribution device 20, see FIG. 1). The uplink RF signal ULS1 may include the reception signals R1, R2 of the first and second frequency bands. The reception signals R1, R2 of the first and second frequency bands may be signals of different frequency bands.

The optical conversion unit 31 may include an optical compensation attenuator (not shown) for performing an optical compensation according to the optical loss in the optical medium 40.

The downlink path control unit 33_1*d* may control the transmission path of the downlink RF signal DLS1 received from the optical conversion unit 31.

For example, the downlink path control unit 33_1*d* may transmit the downlink RF signal DLS1 to the second remote driving unit 35_2 through the first remote driving unit 35_1. Specifically, the downlink path control unit 33_1*d* may transmit the downlink RF signal DLS1 to the first remote driving unit 35_1, and receive the downlink RF signal DLS1, i.e., the downlink RF signal DLS2, outputted from the first remote driving unit 35_1 (DLS1) to transmit the downlink RF signal DSL2 to the second remote driving unit 35_2. Here, the downlink RF signal DLS1 and the downlink RF signal DLS2 is substantially the same signal. That is, the downlink path control unit 33_1*d* may control the transmission path of the downlink RF signal DLS1 so that the first remote driving unit 35_1 extracts the transmission signal T1 of the first frequency band from the downlink RF signal DLS1, and at the same time, again outputs the downlink RF signal DLS1.

Alternatively, the downlink path control unit 33_1*d* may transmit the downlink RF signal DLS1 directly to the second remote driving unit 35_2 by bypassing the first remote driving unit 35_1.

The uplink path control unit 33_1*u* may control the transmission path of the uplink RF signal ULS2 received from the second remote driving unit 35_2.

For example, the uplink path control unit 33*u* may transmit the uplink RF signals ULS2 to the optical conversion unit 31 through the first remote driving unit 35_1. Specifically, the uplink path control unit 33*u* may transmit the uplink RF signal ULS2 to the first remote driving unit 35_1, and receive the uplink RF signal ULS1 and the uplink RF signal ULS2 outputted from the first remote driving unit 35_1 to transmit the uplink RF signal USL1 and the uplink RF signal ULS2 to the optical conversion unit 31. That is, the uplink path control unit 33_1*u* may control the transmission path of the uplink RF signal ULS2 so that the first remote driving unit 35_1 combines the uplink RF signal ULS1 and the uplink RF signal ULS2 to transmit to the optical conversion unit 31.

Alternatively, the uplink path control unit 33_1*u* may transmit the uplink RF signal ULS2 directly to the optical conversion unit 31 by bypassing the first remote driving unit 35_1.

The first and second remote driving units 35_1, 35_2 each may transmit signals of different frequency bands, and perform filtering and amplification of the downlink RF signal and uplink RF signal for this purpose.

The first remote driving unit 35_1 may extract and output the transmission signal T1 of the first frequency band from the downlink RF signal DLS1 received from the downlink path control unit 33_1*d*. The first remote driving unit 35_1 may output the downlink RF signal DLS1 back as the downlink RF signal DLS2 to transmit to the downlink path control unit 33_1*d*. As described above, the downlink RF signal DLS1 and the downlink RF signal DLS2 are substantially the same signal. The transmission signal T1 of the first frequency band is combined together with the transmission signal T2 of the second frequency band by a multiplexer (not shown) thereby being radiated via an antenna (not shown).

The first remote driving unit 35_1 may receive the reception signal R1 of the first frequency band provided from a terminal (not shown). The first remote driving unit 35_1 may receive the uplink RF signal ULS2 including the reception signal R2 of the second frequency band from the second remote driving unit 35_2. The first remote driving unit 35_1 may combine the reception signal R1 of the first frequency band and the reception signal R2 of the second frequency band to generate the uplink RF signal ULS1 and output the uplink RF signal ULS1 to the uplink path control unit 33_1*u*.

The second remote driving unit 35_2 may extract and output the transmission signal T2 of the second frequency band from the downlink RF signal DLS2 received from the downlink path control unit 33_1*d*. The second remote driving unit 35_2 may receive the reception signal R2 of the second frequency band provided from a terminal (not shown). The second remote driving unit 35_2 may output the uplink RF signal ULS2 including the reception signal R2 of the second frequency band.

As such, the first and second remote driving units 35_1, 35_2 each receive the downlink RF signals divided according to each frequency band without amplification and transmission, are connected in series connected to each other through the downlink path control unit 33_1*d* to receive the same downlink RF signals, extract and output signals of required frequency bands from the same downlink RF signals, and allow the signals of different frequency bands received through the uplink path control unit 33_1*u* to be accumulatively combined thereby being outputted to the optical conversion unit 31.

Accordingly, the remote device 30 does not require the division of the downlink RF signal and the combination of the uplink RF signal by one divider thereby preventing damage of the original signal and improving reliability. Further, the remote device 30 allows series wiring therein, without parallel wiring, between one divider and the remote driving units, thereby rendering wiring design easy and reducing the possibility of erroneous connection between the units.

Further, in the case where the first remote driving unit 35_1 is removed from the remote device 30, the downlink path control unit 33_1*d* allows the downlink RF signal DLS1 to be transmitted directly to the second remote driving unit 35_2 without passing through the first remote driving unit 35_1, and the uplink path control unit 33_1*u* allows the uplink RF signal ULS2 to be transmitted directly to the optical conversion unit 31 without passing through the first remote driving unit 35_1. Accordingly, the optical conversion unit 31 and the second remote driving unit 35_2 are directly connected to each other, and thus, the remote device 30 can operate normally.

Accordingly, even if a signal of the frequency band of the first remote driving unit 35_1 becomes unnecessary during a mobile communication service or the first remote driving unit 35_1 is removed from the remote device 30 due to maintenance, replacement, or the like of the first remote driving unit 35_1, the remote device 30 may operate normally.

Figure 3:
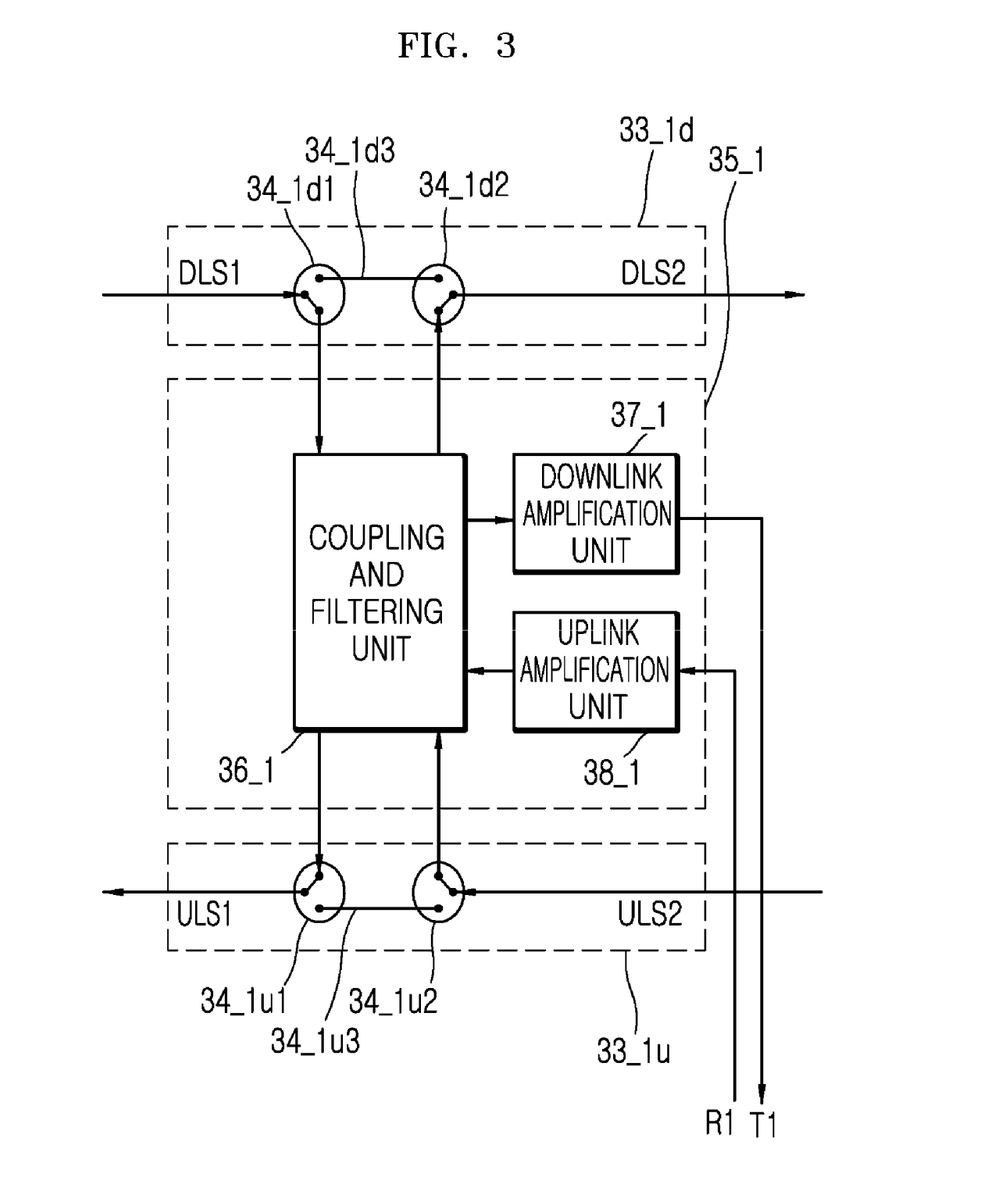
FIGS. 3 and 4 are views illustrating a partly detailed structure of the remote device shown in FIG. 2.
Figure 4:
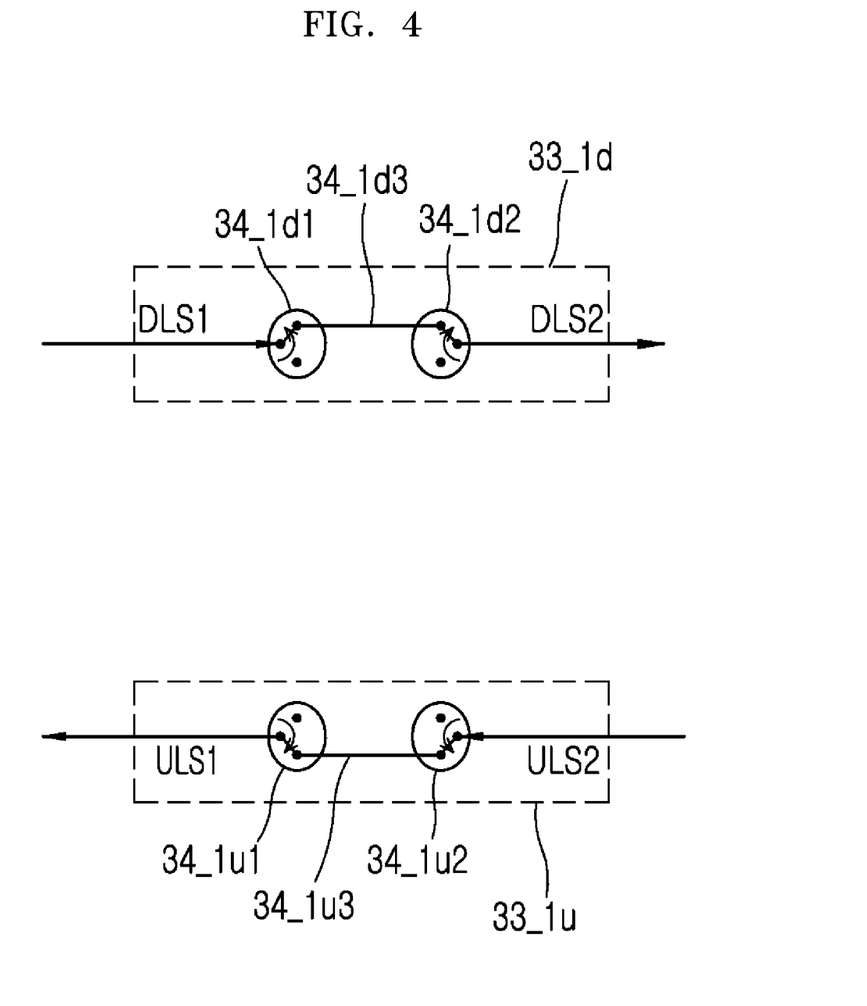

FIGS. 3 and 4 are views illustrating in detail a portion of the configuration of the remote device 30 shown in FIG. 2. FIG. 3 is a view showing in more detail the downlink path control unit 33_1*d*, the uplink path control unit 33_1*u* and the first remote driving unit 35_1 in the case where the first remote driving unit 35_1 is mounted in the remote device 30. FIG. 4 is a view showing in detail the downlink path control unit 33_1*d* and the uplink path control unit 33_1*u* in the case where the first remote driving unit 35_1 is removed from the remote device 30. In FIGS. 3 and 4, the same reference numerals as in FIG. 2 refer to the same members, and accordingly, the detailed descriptions thereof will be omitted to avoid repetition.

Referring to FIGS. 3 and 4, the downlink path control unit 33_1*d* may include first and second switches 34_*d*1, 34_*d*2 and a bypass line 34_1*d*3.

The first switch 34*d*1 may control the connection between the optical conversion unit 31 (see FIG. 2) and the first remote driving unit 35_1, or the connection between the optical conversion unit 31 and the bypass line 34_1*d*3. The first switch 34_1*d*1 may be configured, for example, with a three-terminal connector, which connects the optical conversion unit 31 and the first remote driving unit 35_1 when the first remote driving unit 35_1 is mounted to the remote device 30 and connects the optical conversion unit 31 and the bypass line 34_1*d*3 automatically when the first remote driving unit 35_1 is removed from the remote device 30.

The second switch 34_1*d*2 may control the connection between the first remote driving unit 35_1 and the second remote driving unit 35_2 (see FIG. 2), or the connection between the bypass line 34_1*d*3 and the second remote driving unit 35_2. The second switch 34_1*d*2 may be configured, for example, with a three-terminal connector, which connects the first remote driving unit 35_1 and the second remote driving unit 35_2 when the first remote driving unit 35_1 is mounted to the remote device 30 and connects the bypass line 34_1*d*3 and the second remote driving unit 35_2 automatically when the first remote driving unit 35_1 is removed from the remote device 30.

The bypass line 34_1*d*3 may be a line connecting the terminals which are not connected to the optical conversion unit 31 and the first and second remote driving units 35_1, 35_2 in the first and second switches 34_1*d*1, 34_1*d*2 so as to bypass the first remote driving unit 35_1.

The uplink path control unit 33_1*u* may also include the first and second switches 34_1*u*1, 34_1*u*2, and the bypass line 34_1*u*3.

The first switch 34_1*u*1 may control the connection between the optical conversion unit 31 and the first remote driving unit 35_1, or the connection between the optical conversion unit 31 and the bypass line 34_1*u*3. The first switch 34*u*1 may be configured, for example, a three-terminal connector, which connects the optical conversion unit 31 and the first remote driving unit 35_1 when the first remote driving unit 35_1 is mounted to the remote device 30 and connects the optical conversion unit 31 and the bypass line 34_1*u*3 automatically when the first remote driving unit 35_1 is removed from the remote device 30.

The second switch 34_1*u*2 may control the connection between the first remote driving unit 35_1 and the second remote driving unit 35_2, or the connection between the bypass line 34_1*u*3 and the second remote driving unit 35_2. The second switch 34_1*u*2 may also be configured, for example, with a three-terminal connector, which connects the first remote driving unit 35_1 and the second remote driving unit 35_2 when the first remote driving unit 35_1 is mounted to the remote device 30 and connects the bypass line 34_1*u*3 and the second remote driving unit 35_2 automatically when the first remote driving unit 35_1 is removed from the remote device 30.

The bypass line 34_1*u*3 may be a line connecting the terminals which are not connected to the optical conversion unit 31 and the first and second remote driving units 35_1, 35_2 in the first and second switches 34_1*u*1, 34_1*u*2 so as to bypass the first remote driving unit 35_1.

The first remote driving unit 35_1 may include the coupling and filtering unit 36_1, a downlink amplification unit 37_1 and a uplink amplification unit 38_1.

The coupling and filtering unit 36_1 may extract the transmission signal T1 of the first frequency band from the downlink RF signal DLS1.

The coupling and filtering unit 36_1 may output the downlink RF signal DLS1 back to the downlink path control unit 33_1*d*. That is, the coupling and filtering unit 36_1 outputs the downlink RF signal DLS2 which is substantially the same as the downlink RF signal DLS1 to the downlink path control unit 33_1*d* so that the downlink path control unit 33_1*d* transmits the downlink RF signal DLS2 to the second remote driving unit 35_2.

The coupling and filtering unit 36_1 may receive the reception signal R1 of the first frequency band amplified by the uplink amplification unit 38_1, receive the uplink RF signal DLS2 including the reception signal of the second frequency band from uplink path control unit 33_1*u*, and couple the reception signals R1, R2 of the first and second frequency bands. The coupling and filtering unit 36_1 may output the uplink RF signal ULS1 to the uplink path control unit 33_1*u*.

The coupling and filtering unit 36_1 may include, for example, a coupler and a band pass filter.

The downlink amplification unit 37_1 may amplify and output the transmission signal T1 of the first frequency band outputted from the coupling and filtering unit 36_1. Here, the transmission signal T1 of the first frequency band may be transmitted to a terminal (not shown) through a multiplexer (not shown) and an antenna (not shown). The downlink amplification unit 37_1 may include, for example, an amplifier.

The uplink amplification unit 38_1 may amplify and output the reception signal R1 of the first frequency band received from the terminal. The uplink amplification unit 38_1 may receive the reception signal R1 of the first frequency band through the antenna and the duplexer. The uplink amplification unit 38_1 may amplify the reception signal R1 of the first frequency band to output it to the coupling and filtering unit 36_1. The uplink amplification unit 38_1 may include, for example, an amplifier.

Figure 5:
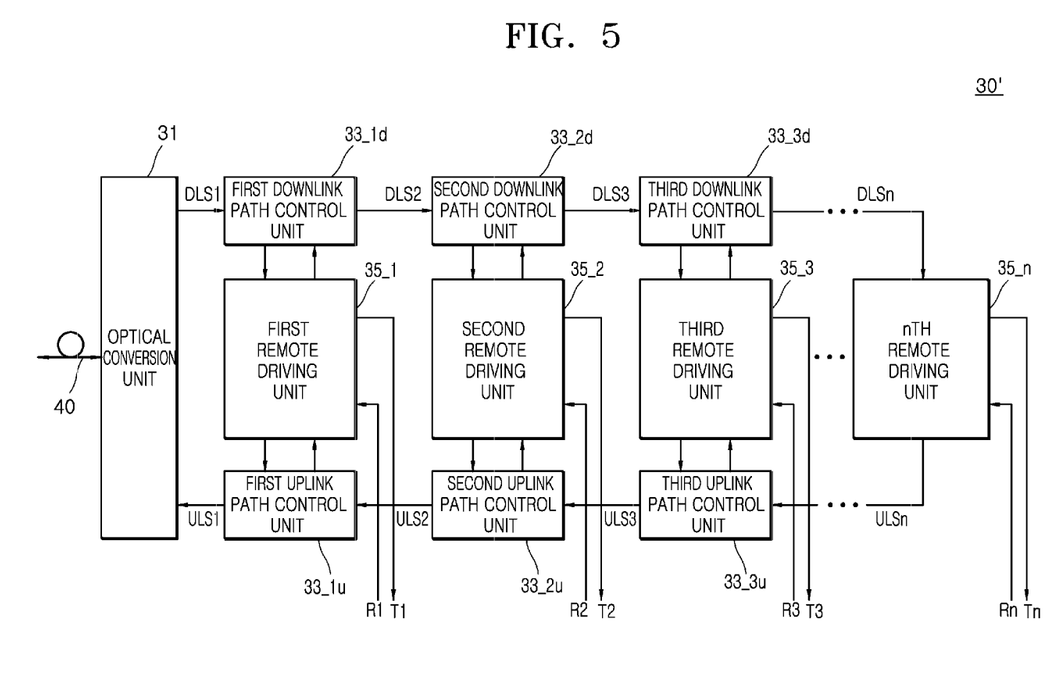
FIG. 5 is a schematic block diagram showing a remote device according to another embodiment of the inventive concept.

FIG. 5 is a schematic block diagram showing the remote device 30' according to another embodiment of the inventive concept. In FIG. 5, it is shown that the remote device 30' is provided with a larger number of remote driving units than in the remote unit 30 of FIG. 2. Hereinafter, since similar or same reference numerals as in FIGS. 2 to 4 indicate similar or same members, repeated descriptions will be omitted and differences will be mainly described.

Referring to FIG. 5, the remote device 30' may include the optical conversion unit 31, the first to n–1th downlink path control unit 33_1*d* to 33_*n*–1d, the first to n–1th uplink path control unit 33_1*u* to 33_*n*–1u, and the first to nth remote driving unit 35_1 to 35_*n*.

The first to n–1th downlink path control units 33_1*d* to 33_*n*–1d each may control the transmission path of the downlink RF signals DLS1 to DLSn–1 received. The first to n–1th downlink path control units 33_1*d* to 33_*n*–1d each may transmit the downlink RF signals DLS1 to DLSn–1 received through the corresponding remote driving unit to the downlink path control unit of a lower level, or transmit the downlink RF signals DLS1 to DLSn–1 received by bypassing the corresponding remote driving unit to the downlink path control unit of a lower level (transmit to the nth remote driving unit in the case of the lowest level). Here, the downlink RF signals DLS1 to DLSn–1 may be same signals from one another.

The first to n–1th uplink path control units 33_1*u* to 33_*n*–1u each may control the transmission path of the uplink RF signals ULS1 to ULSn–1 received. The first to n–1th uplink path control units 33_1*u* to 33_*n*–1u each may transmit the uplink RF signals ULS1 to ULSn–1 received through the corresponding remote driving unit to the uplink path control unit of a higher level, or transmit the uplink RF signal ULS1 to ULSn–1 received by bypassing the corresponding remote driving unit to the uplink path control unit of a higher level (transmit to the optical conversion unit 31 in the case of highest level). Here, the higher level the uplink RF signals ULS1 to ULSn–1 become, the more the reception signal of at least one frequency band included in the uplink RF signal of a lower level is coupled.

The first to nth remote driving units 35_1 to 35_*n* each may transmit and receive the signals of different frequency bands, and perform filtering and amplification of the uplink RF signal and the downlink RF signal for this purpose.

The first to nth remote driving units 35_1 to 35*n* each may extract and output the transmission signals T1 to Tn of the corresponding frequency band from the downlink RF signal DLS1 including the signals of the whole frequency bands, and receive the reception signals R1 to Rn of the corresponding frequency band from the terminal. The first to nth remote driving units 35_1 to 35_*n* each may output the downlink RF signal to the corresponding downlink path control unit so as to transmit it to the remote driving unit of a lower level. Further, the first to nth remote driving unit 35_1 to 35_*n* each may allow the reception signal of at least one frequency band included in the uplink RF signal of a lower level to be coupled with the reception signal of frequency band received by themselves, thereby outputting it to the corresponding uplink path control unit.

As such, the first to nth remote driving units 35_1 to 35_*n* each are connected in series to each other, without being connected in parallel, to transmit and receive signals divided for each frequency band, thereby receiving same downlink RF signals through the corresponding downlink path control unit, extracting and outputting signals of respectively required frequency bands from the received downlink RF signals, and allowing the signals of different frequency bands received by each through the corresponding uplink path control unit to be accumulatively combined and outputted to the optical conversion unit 31.

Accordingly, the remote device 30' may prevent damage of the original signal similarly to the remote device 30 thereby enhancing the reliability thereof, and allow the plurality of remote driving units to be simply wired in series thereby making it easy to arrange the remote driving units and design the wiring thereof and reducing the possibility of erroneous connection there-between.

Figure 6:
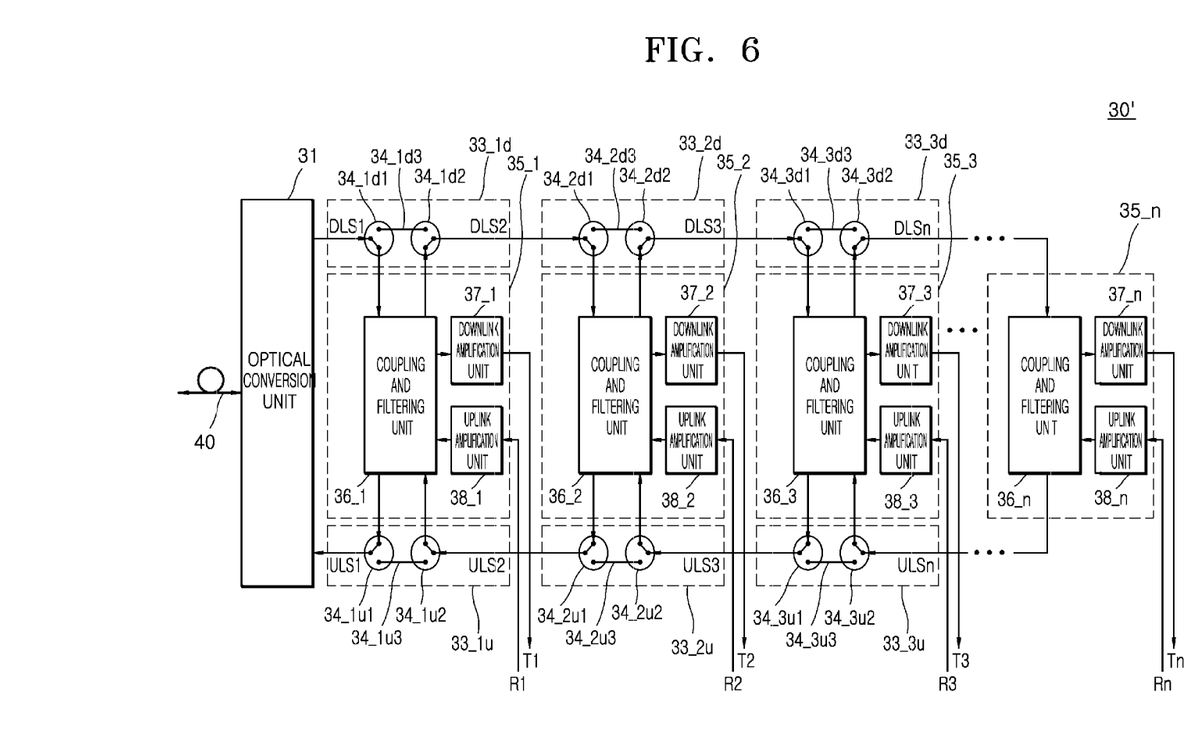
FIGS. 6 and 7 are views illustrating a partly detailed structure of the remote device shown in FIG. 5.
Figure 7:
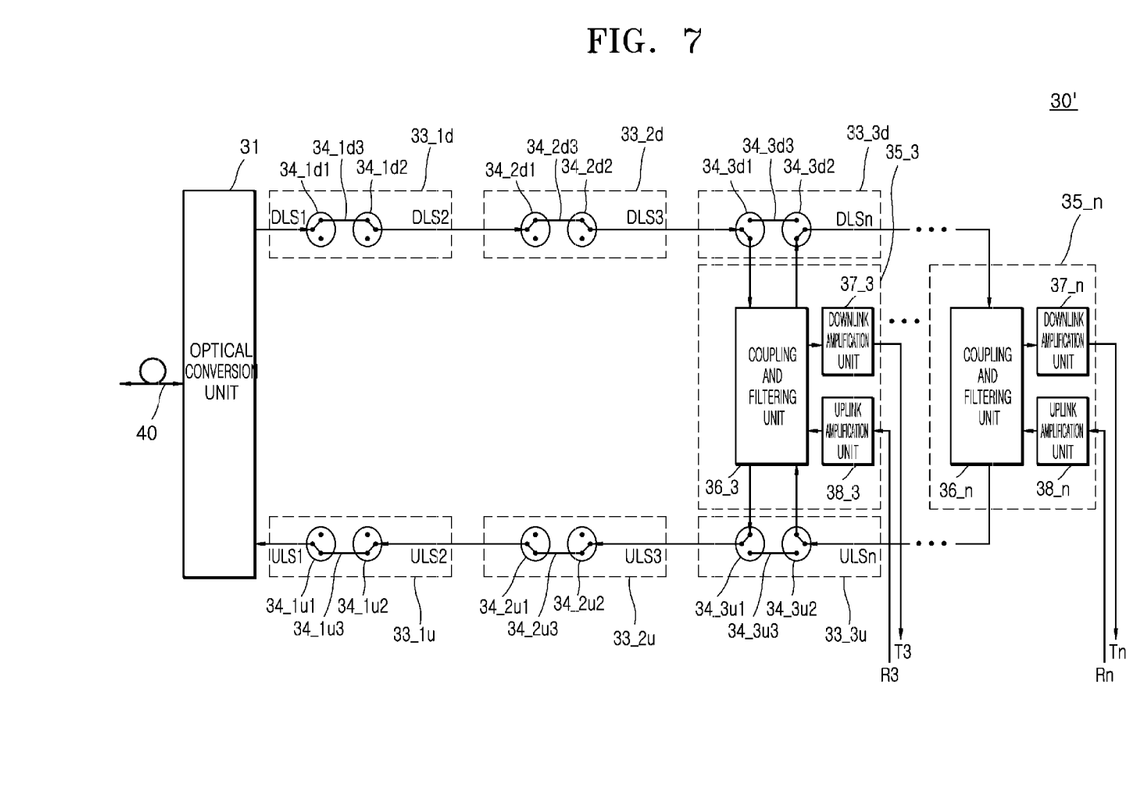

FIGS. 6 and 7 are diagrams illustrating in more detail the configuration of a portion of the remote device part 30' of FIG. 5. FIG. 6 is a diagram showing in detail the first to n−1th downlink path control units 33_1d to 33_n−1d, the first to n−1th uplink path control units 33_1u to 33_n−1u, and the first to nth remote driving units 35_1 to 35_n in the case where the first to nth remote driving units 35_1 to 35_n are mounted to the remote device 30'. FIG. 7 is a diagram showing in detail the first to n−1th downlink path control units 33_1d to 33_n−1d, the first to n−1th uplink path control units 33_1u to 33_n−1u, and the third to nth remote driving units 35_3 to 35_n in the case where the first and second remote driving units 35_1 to 35_2 are removed from the remote device 30'. In FIGS. 6 and 7, like or similar reference numerals as in FIGS. 3 to 5 indicate like or similar members, and hereinafter, repeated descriptions will be omitted and differences will be mainly explained.

Referring to FIGS. 6 and 7, the first to n−1th downlink path control units 33_1d to 33_n−1d and the first to n−1th uplink path control units 33_1u to 33_n−1u each may include the corresponding first and second switches 34_1u1 to 34_n−1u1 and 34_1u2 to 34_n−1u2, and bypass lines 34_1u3 to 34_n−1u3. The first and second switches 34_1u1 to 34_n−1u1, 34_1u2 to 34_n−1u2 may be configured with, for example, a three-terminal connector.

The first to nth remote driving units 35_1 to 35_n each may include the corresponding coupling and filtering units 36_1 to 36_n, downlink amplification units 37_1 to 37_n, and uplink amplification units 38_1 to 38_n.

The first to nth remote driving units 35_1 to 35_n are interconnected in series, as shown in FIG. 6, through the corresponding first to n−1 downlink path control units 33_1d to 33_n−1d and the first to n−1th uplink path control units 33_1u to 33_n−1u, and may be maintained in the series connection state even in the case where the first and second remote driving units 35_1, 35_2 are removed, shown in FIG. 7.

That is, the remote device 30' can operate normally even when a signal of frequency band of a portion of the remote driving units is unnecessary during a mobile communication service or when a portion of the remote driving units is removed from the remote device 30' due to maintenance, replacement thereof, etc.

While the inventive concept has been described with respect to the specific embodiments, it will be apparent to those skilled in the art that various changes and modifications may be made without departing from the spirit and scope of the invention as defined in the following claims.

What is claimed is:

1. A remote device, comprising:
    a downlink path control unit configured to transmit a downlink Radio Frequency (RF) signal output from an optical conversion unit to a first remote driving unit, and transmit the downlink RF signal output from the first remote driving unit to a second remote driving unit when the first and second remote driving units are mounted in the remote device,
    wherein the downlink path control unit is further configured to directly transmit the downlink RF signal output from the optical conversion unit to the second remote driving unit when the first remote driving unit is detached from the remote device and the second remote driving unit is mounted in the remote device, and
    wherein the first and second remote driving units are configured to be detachably mounted in the remote device, extract transmission signals of different frequency bands, respectively, from the downlink RF signal, and output the transmission signals.

2. The remote device of claim 1, wherein the downlink path control unit comprises:
    a first switch for controlling a connection between the optical conversion unit and the first remote driving unit or a connection between the optical conversion unit and a bypass line; and
    a second switch for controlling a connection between the first remote driving unit and the second remote driving unit or a connection between the bypass line and the second remote driving unit.

3. The remote device of claim 1, wherein the first remote driving unit comprises:
    a coupling and filtering unit for transmitting the downlink RF signal to the second remote driving unit through the downlink path control unit and extracting a transmission signal of a first frequency band from the downlink RF signal; and
    a downlink amplification unit for amplifying and outputting the transmission signal of the first frequency band extracted.

4. The remote device of claim 1, wherein the optical conversion unit converts an optical signal into the downlink RF signal and output the downlink RF signal.

5. The remote device of claim 1, wherein the first remote driving unit receives a reception signal of first frequency band, the second remote driving unit receives a reception signal of second frequency band, and the remote device further comprises an uplink path control unit configured to transmit the reception signal of the second frequency output from the second remote driving unit to the first remote driving unit, and transmit the reception signal of the first frequency band and the reception signal of the second frequency band output from the first remote driving unit to the optical conversion unit when the first remote driving unit is mounted in the remote device, or directly transmit the reception signal of the second frequency band to the optical conversion unit when the first remote driving unit is detached from the remote device.

6. The remote device of claim 5, wherein the uplink path control unit comprises:
    a first switch for controlling a connection between the optical conversion unit and the first remote driving unit or a connection between the optical conversion unit and a bypass line; and
    a second switch for controlling a connection between the first remote driving unit and the second remote driving unit or a connection between the bypass line and the second remote driving unit.

7. The remote device of claim 5, wherein the first remote driving unit comprises:
    a coupling and filtering unit for transmitting the downlink RF signal to the second remote driving unit through the downlink path control unit and extracting a transmission signal of the first frequency band from the downlink RF signal;
    a downlink amplification unit for amplifying and outputting the transmission signal of the first frequency band extracted; and
    an uplink amplification unit for amplifying and outputting the reception signal of the first frequency band,
    wherein the coupling and filtering unit receives the reception signal of the first frequency band amplified from the uplink amplification unit, receives the reception signal of the second frequency band from the second remote driving unit through the uplink path control unit, and couple and output the amplified reception signal of the first frequency band and the reception signal of the second frequency band.

\* \* \* \* \*